United States Patent [19]
Hunziker, Jr.

[11] 3,965,868
[45] June 29, 1976

[54] LABORATORY MOUSE FEEDER

[75] Inventor: John Hunziker, Jr., Pine Bluff, Ark.

[73] Assignee: The United States of America as represented by the Secretary of the Department of Health, Education and Welfare, Washington, D.C.

[22] Filed: Apr. 14, 1975

[21] Appl. No.: 567,718

Related U.S. Application Data

[63] Continuation-in-part of Ser. No. 464,489, April 25, 1974, Pat. No. 3,902,459.

[52] U.S. Cl. ............................. 119/52 R; 119/18
[51] Int. Cl.² ........................................ A01K 5/00
[58] Field of Search ............ 119/52 R, 51.12, 51 R, 119/51 FS, 53, 54, 55, 58, 59, 60, 61, 64, 63, 18

[56] References Cited
UNITED STATES PATENTS

| | | | |
|---|---|---|---|
| 815,625 | 3/1906 | Nottage | 119/52 R |
| 1,029,660 | 6/1912 | Blanchett | 119/52 R |
| 1,205,557 | 11/1916 | Metzger | 119/58 |
| 1,462,751 | 7/1923 | Huntington | 119/61 |

*Primary Examiner*—Louis G. Mancene
*Assistant Examiner*—Peter K. Skiff
*Attorney, Agent, or Firm*—Browdy and Neimark

[57] ABSTRACT

A feed hopper for the cage of a laboratory mouse comprises a substantially rectangular parallelepiped feed chamber containing an open top. A wire mesh base screen is affixed to at least one front surface of the chamber, having a top portion of the wire screen fastened at an angle with respect to the plane of that front surface, and a bottom portion of the screen parallel to the plane of the open top of the feeder. Feed which is to be ingested by the mouse rests on the base wire screen which has been designed in such a manner that the weight of the feed is forced to collapse as the animal consumes the feed, thus providing a continual flow and availability of feed. Furthermore, the sides of the wire mesh openings are such that commercially available, autoclavable mash feed could be used. The mouse feeds by moving its tongue over the screen to pick up food particles thereon. The feeder is designed to restrict the entry of the animal into the feeder and thus prevent the contamination of the feed through feces or urine which would distort research results.

7 Claims, 3 Drawing Figures

LABORATORY MOUSE FEEDER

FIELD OF THE INVENTION

This is a Continuation-in-Part of U.S. Ser. No. 464,489, now U.S. Pat. No. 3,902,459, and all of the subject matter contained in that application is hereby incorporated by reference into the present application.

The present invention relates to a feeder for laboratory mice which are used for experimental purposes and, more particularly, to such a device which restricts the entry of the mice into the feeder.

BACKGROUND OF THE INVENTION

Experimental mice are used in various studies of diseases, and effects of experimental diets, drugs, and other treatments designed for the benefit of mankind. It is highly desirable in evaluating the effects of drugs, diet and the like, to eliminate errors and any possibility of misleading results caused by reason of a mouse urinating or defecating into its food, and thereby reinjecting the drugs or foods or metabolites thereof, normally excreted in the urine or the feces.

Furthermore, current trends in toxicology and safety evaluation concerning modern drugs and preparations have necessitated an increase in long-term feeding studies of laboratory animals undergoing tests and observations. It has been determined that long-term feeding experiments, in order to produce valid and reliable results relating to food consumption, must be conducted under extremely careful feeding conditions.

Of utmost importance is the elimination of food contamination that will occur if the animal is permitted access to food which has been exposed to animal excretions. In many instances, an animal may obtain an overdose of a drug fed to it by eating food contaminated by fecal matter or urine carrying some percentage of the original dosage, thereby inducing false test results and inaccurate observations and calculations. Moreover, in long-term feeding studies, it is essential to determine exact consumption, without losses due to spillage, while maintaining conditions of utmost cleanliness.

The early prior art feeders either permitted feed to be spilled and mixed with the bedding of the animal or permitted fecal matter to contaminate the feed. Later feeders, such as U.S. Pat. Nos. 3,114,350 and 3,505,977 have attempted to overcome these disadvantages. Although successful, such devices have necessitated the utilization of articulated screen structures or other functionally similar structures. More particularly, such prior art devices are incapable of operating in conjunction with a gravitational feeder.

The specific embodiments disclosed in Ser. No. 464,489, now U.S. Pat. No. 3,902,459, have overcome many of the defects of the prior art such as (1) providing a continuous source of feed dosed with chemical carcinogens to laboratory animals, (2) preventing undue spillage so that consumption of cancer causing chemicals may be accurately measured and (3) preventing contamination of the feed by feces or urine containing microbiologival pathogens and carcinogenic metabolites which distort the research results. However, due to the particular design of these earlier mouse feeder embodiments, only a specially prepared particle-sized feed could be used to prevent bridging or caking, such caking preventing feed flow. This feed is economically impractical to obtain in the large quantities which are needed.

SUMMARY OF THE INVENTION

A principal object of the present invention is to overcome the defects of the prior art, as indicated above.

Another object of the present invention is to provide an improved feeding system for laboratory mice.

Another object is to provide a mouse feeder which permits little or no spillage of feed, thereby permitting accurate measurement of the feed consumed.

Yet another object of the present invention is to avoid contamination of the feed with feces or urine.

Still another object of the present invention is to develop a laboratory feeder which utilizes commercially available, autoclavable mash feed.

In furtherance of these and other objects, a principal feature of the instant invention is a feeding system which makes available to the mouse only a small quantity of feed and which offers such feed to the mouse in such a manner that it is only able to eat and not to contaminate the feed. The feeder is capable of using a more economical, commercially available, autoclavable mash feed, and still retains the advantageous features of the embodiments enclosed in U.S. Pat. No. 3,902,459.

The feeder of the present invention essentially consists of a container having an open top through which laboratory feed may be deposited. The lower portion of the feeder containers feeder openings in which a wire mesh screen is inserted. This screen consists of a top and bottom section. The top section, upon which the laboratory feed rests, is mounted at an angle relative to the surface or surfaces which carry the feeder openings.

The bottom section of the screen is substantially horizontal and allows for the collection of spillage. A plurality of partitions are provided to prevent the animal from entering the feeder openings and contaminating the feed with urine or feces.

For a better understanding of the inventon, a possible embodiment thereof will now be described with reference to the attached drawing, it being understood that the embodiment is intended to be merely exemplary and in no way limitative.

DETAILED DESCRIPTION OF A PREFERRED EMBODIMENT

Figure 1:
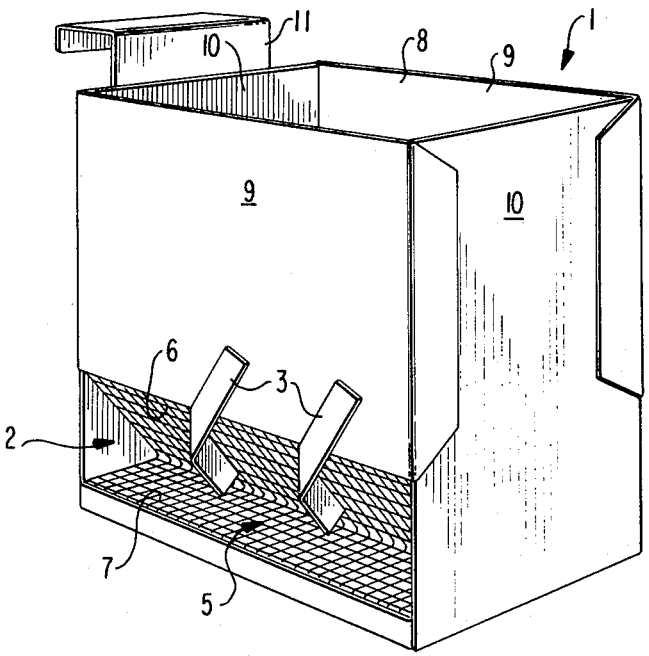
FIG. 1 is a perspective view of the laboratory mouse feeder in accordance with the present invention and which is designed to hang from the side of an animal cage.
Figure 2:
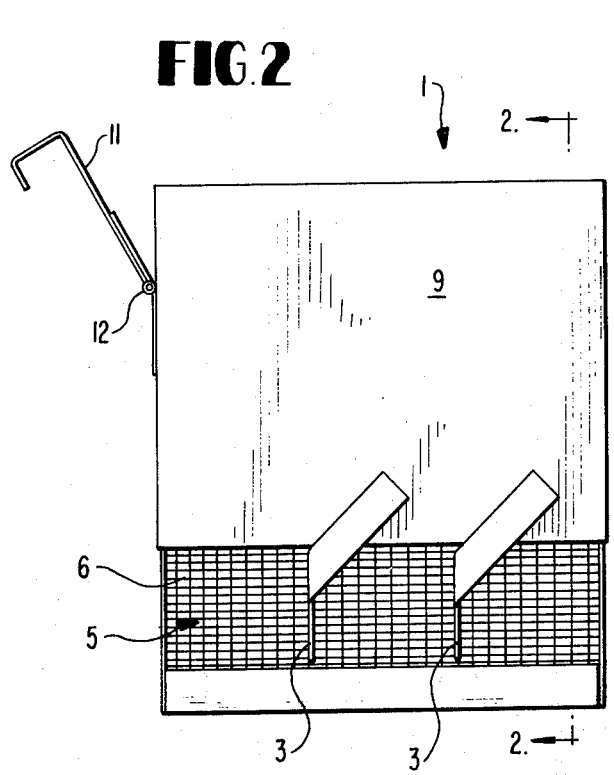
FIG. 2 is a front view of the feeder shown in FIG. 1.

A laboratory mouse feeder 1 consists of a substantially rectangular parallelpiped having two opposite front surfaces 9 and two opposite side surfaces 10. This feeder may be constructed of any conventional material such as stainless steel, aluminum or any other durable and non-toxic material or even suitable high temperature resistant and strong plastic. On the lower portions of the front surface 9, openings 2 are provided for the insertion of wire mesh screens 5 each having a top portion 6 and a bottom portion 7.

The top screen portion 6 is mounted in the opening 2 at an angle relative to the front surface 9. The exact angle of the screen portion 6 in the feeder opening 2 is selected to provide a maximum area for exposure of laboratory feed 4 to the laboratory animal with relative ease of feeding, but yet maintain a structural design so that the proportional area in all directions of the top portion 6 on which the feed rests is such that the weight of the feed above this portion forces a continual collapsing downwardly of the feed as it is consumed from below by the laboratory animal, thusly providing a continual flow and availability of feed. In this regard, it has been found that an angle of 45° provides excellent results.

The bottom screen portion 7 is substantially parallel to the planes of the open top 8 and the bottom 14 of the feeder 1, i.e. normally horizontal. This section 7 allows for spillage 13 to be accumulated between the wire mesh screen and the bottom 14 where it may be consumed as it accumulates by the mouse by inserting its tongue through the screen as in U.S. Pat. No. 3,902,459. This particular configuration of the screen 5 allows the use of a commercially available, autoclavable steam sterilizable mash feed instead of a specially prepared feed as required by embodiments disclosed in Ser. No. 464,489, now U.S. Pat. No. 3,902,459.

The present feeder offers the feed to the mouse over a relatively large area and the mouse eats through the screen with its tongue, moving its tongue over the top screen 6 while the weight of the remaining feed causes continuous replacement onto the screen of that which has been eaten, allowing a continuous supply of feed to the laboratory animal. A smaller opening in the wire mesh screen such as 1/16th of an inch may be utilized because this particular size supports the powdered mash feed 4 without going through its openings and still allows the mouse to feed through the openings because the feed is available to the animal's tongue.

The feeder is provided with a plurality of partitions 3 which are affixed to the bottom edge of the side 9 for preventing the animal from climbing into the feeder openings 2 and contaminating the feed with urine or feces. These partitions 3 are mounted far enough apart to allow the laboratory animal's head to enter into the opening 2, but are close enough together to prevent the animal itself from entering the feeder openings 2. These may also be constructed of stainless steel of any other, durable material or metal.

To conserve floor space in the animal cage, the feeder 1 can be hung above the floor of the cage utilizing an L-shaped plate 11 which is attached to the upper portion of a side wall 10. The L-shaped plate 11 and the side wall 10 of the feeder form a U-shaped channel for interlocking with the upper portion of a wall of the animal cage. In this regard, it should be noted that any suitable mounting means such as hooks, may be employed. Furthermore, the L-shaped plate 11 can be movable with respect to the side wall 10 through the use of a hinge 12.

Figure 3:
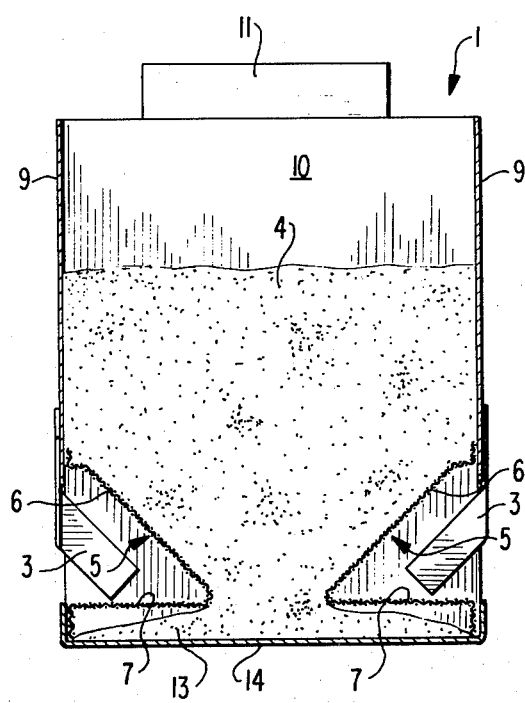
FIG. 3 is a cross-sectional view of the feeder shown in FIG. 2 taken through lines 2—2.

In operation, the feed 4 is placed into the feeder 1 via its open top 8 and is allowed to funnel down to the lower portion of the feeder so that an amount of feed rests on the top portion 6 of the wire mesh screen 5 (see FIG. 3). The feeder is then weighed and then placed in the laboratory animal cage. As the animal eats the feed, by moving its tongue over the screen 6 the weight of the remaining feed becomes so great it is replaced due to gravitational flow and equal quantity of feed stored in the feed chamber 1 thereabove.

The inherent advantage of the present feed system is that an accurate determination can be made of the feed consumed. This permits calculation of the dose of a chemical fed to an animal in the food. The non-contamination of the food is also important because research results can be influenced greatly by the repeated ingestion of a test chemical and/or its metabolites. Because the animal is unable to get more than its head over the screen portion of the feeder, it cannot defecate or urinate into the feed. Furthermore, any food particles which drop from the animal's mouth will be collected as spillage within the feeder below the bottom screen portion 7. At the end of a feeding cycle, such as 1 week, the feeder is then reweighed and the remaining feed is discarded. The feeder can then be washed, sterilized and returned for reuse.

The foregoing description of the specific embodiments will so fully reveal the general nature of the invention that others can, by applying current knowledge, readily modify such specific embodiment and/or adapt them for various applications without departing from the generic concept, and therefore such adaptations and modifications should and are comprehended within the meaning and range of equivalents of the disclosed embodiments. Further, it is to be understood that the phraseology and terminology employed herein is for the purposes of description and not of limitation.

It will be obvious to those skilled in the art that various changes may be made without departing from the scope of the invention and the invention is not to be considered to what is shown in the drawing and described in the specification.

What is claimed is:

1. A feeding device and feed storage hopper for laboratory mice, comprising:

wall means defining a chamber closed at its bottom holding a quantity of animal feed, said chamber having an upper portion, a lower portion, a feed inlet means at its upper portion and a feeding opening in its lower portion above the closed bottom;

a generally V-shaped feeding means mounted in the feeding opening in the lower portion for allowing mice to feed, said feeding means comprising an upper and lower screen which project inwardly toward the center of said chamber and meet in the apex of the V, said upper screen being affixed in said feed opening at an inclined angle sufficient so that the weight of the feed thereabove forces a continual collapsing downwardly of the feed as it is comsumed from below, said lower screen being horizontally affixed in said opening below said upper screen and above said closed bottom, wherein a mouse can ingest the feed resting on said upper screen, said upper and lower screen having a mesh size sufficient to support powdered mash feed without going through its openings while allowing a mouse to feed therethrough; and partition means connected to said feeding means for preventing the mice from entering said feeder means thereby precluding contamination of the feed through feces or urine.

2. The feed hopper according to claim 1, further comprising mounting means attached to said wall means for mounting the hopper on the cage.

3. The feeder hopper according to claim 1, wherein said chmber is substantially rectangular in shape.

4. A feed hopper according to claim 3, wherein said feeding opening is disposed in one wall of said chamber, and further comprising a second feed opening in the wall opposite said one wall, said second feed opening containing a second generally V-shaped feeding means mounted therein.

5. The feed hopper according to claim 1, wherein said feeding means is a wire mesh screen having openings of 1/16th of an inch.

6. A feed hopper according to claim 1, wherein said upper screen is disposed at an angle of 45°.

7. A feed hopper according to claim 1, wherein said upper and lower screens constitute a unitary screen bent to a V-shape.

* * * * *